(12) United States Patent
Ruffell

(10) Patent No.: US 12,495,817 B2
(45) Date of Patent: Dec. 16, 2025

(54) GRAPE SKIN COMPOSITIONS AND COMPOUNDS, AND METHODS OF PREPARATION AND USE THEREFOR

(71) Applicant: PHANTASM LIMITED, Wellington (NZ)

(72) Inventor: Joshua Ruffell, Wellington (NZ)

(73) Assignee: PHANTASM LIMITED, Wellington (NZ)

(*) Notice: Subject to any disclaimer, the term of this patent is extended or adjusted under 35 U.S.C. 154(b) by 0 days.

(21) Appl. No.: 17/940,211

(22) Filed: Sep. 8, 2022

(65) Prior Publication Data
US 2023/0022145 A1 Jan. 26, 2023

Related U.S. Application Data

(63) Continuation of application No. PCT/NZ2021/050090, filed on Jun. 10, 2021.

(30) Foreign Application Priority Data

Jun. 10, 2020 (NZ) ........................ 765291

(51) Int. Cl.
| | |
|---|---|
| A23L 2/02 | (2006.01) |
| A23L 2/56 | (2006.01) |
| C12C 5/02 | (2006.01) |
| C12G 3/02 | (2019.01) |

(52) U.S. Cl.
CPC ............... *A23L 2/02* (2013.01); *A23L 2/56* (2013.01); *C12C 5/026* (2013.01); *C12G 3/02* (2013.01)

(58) Field of Classification Search
CPC .. C12C 5/00; C12C 3/06; C12C 5/026; A23L 2/02; A23L 2/56; C12G 3/026; C12G 3/02
See application file for complete search history.

(56) References Cited

U.S. PATENT DOCUMENTS

| | | | | |
|---|---|---|---|---|
| 4,948,609 A | * | 8/1990 | Nafisi-Movaghar | A23B 7/04 426/321 |
| 6,110,518 A | * | 8/2000 | Cooper | A23L 3/365 426/385 |
| 2011/0305793 A1 | | 12/2011 | Takase et al. | |

FOREIGN PATENT DOCUMENTS

| | | |
|---|---|---|
| CN | 105595144 B | 8/2018 |
| EP | 2377409 A1 | 10/2011 |
| EP | 2377916 A1 | 10/2011 |
| JP | 5746820 B2 | 7/2015 |
| RU | 2630635 C1 | 9/2017 |
| WO | 2019088408 A1 | 5/2019 |

OTHER PUBLICATIONS

SU 1,243,677 (Year: 1985).*
Anfang, N, et al., Co-fermentation with Pichia kluyveri increases varietal thiol concentrations in Sauvignon Blanc. Australian Journal of Grape Wine Research, (2009), 15(1), 1-8.
Brajkovich, M, et al., Effect of screwcap and cork closures on SO2 levels and aromas in a Sauvignon Blanc wine. Journal of Agricultural and Food Chemistry, (2005), 53, 10006-10011.
Coetzee, C., et al., A comprehensive review on Sauvignon blanc aroma with a focus on certain positive volatile thiols. Food Research International, (2012), 45, 287-298.
Darriet, P, et al., Identification of a powerful aromatic component of *Vitis vinifera* L. var. Sauvignon wines: 4-mercapto-4-methylpentan-2-one. Flavour and Fragrance Journal, (1995), 10(6), 385-392.
De Torres, C, et al., Freeze-dried grape skins by-products to enhance the quality of white wines from neutral grape varieties. Food Research International, (2015), 69, 97-105.
Du Plessis, C.S., et al., Initial Study on the Guava Aroma of Chenin Blanc and Colombar Wines. South African Journal of Enology and Viticulture, (1981), 2, 101-103.
Escalante, W.D.E., Perspectives and uses of non-*saccharomyces* yeasts in fermented beverages., Frontiers and New Trends in the Science of Fermented Food and Beverages, IntechOpen, (2018) DOI: http://dx.doi.org/10.5772/intechopen.81868, 19 pages.
Holt, S, et al., The molecular biology of fruity and floral aromas in beer and other alcoholic beverages. FEMS Microbiology Reviews, (2019), 43, 193-222.
Jelley, R.E., et al., Optimization of ecofriendly extraction of bioactive monomeric phenolics and useful flavor precursors from grape waste. ACS Sustainable Chemical Engineering, (2016), 4, 5060-5067.
Jelley, R.E., et al., Fermentation of Sauvignon blanc grape marc extract yields important wine aroma 3-sulfanylhexan-1-ol (3SH). LWT—Food Science and Technology, (2020), 131 109653, 6 pages.
Lund, C.M., et al., New Zealand Sauvignon Blanc Distinct Flavor Characteristics: Sensory, Chemical, and Consumer Aspects. American Journal of Enology and Viticulture, (2009), 60, 1-12.
Maggu, M, et al., Effect of skin contact and pressure on the composition of sauvignon blanc must. Journal of Agricultural and Food Chemistry, (2007), 55, 10281-10288.
Ribéreau-Gayon, P, et al., Handbook of Enology, vol. 1 and 2: The chemistry of wine stabilization and treatments. John Wiley & Sons Ltd, Chicheste, 2006, 948 pages.
Robinson, J (Ed.), The Oxford Companion to Wine, Third Edition, Oxford University Press, 2006, 8 pages.

(Continued)

*Primary Examiner* — Vera Stulii
(74) *Attorney, Agent, or Firm* — Rothwell, Figg, Ernst & Manbeck, P.C.

(57) ABSTRACT

The present disclosure encompasses compositions prepared from grape skins, as well as chemical compounds prepared from these skins. Also encompassed are methods of preparing these compositions and compounds, and methods of using these compositions and compounds. Particularly encompassed are methods of using the grape skin compositions and compounds for preparing various beverages, including fermented beverages, such as beers.

14 Claims, No Drawings

(56) References Cited

OTHER PUBLICATIONS

Roland, A, et al., Varietal thiols in wine: discovery, analysis, and applications. Chemical Reviews, (2011), 111, 7355-7376.

Spanos, GA and Wrolstad, RE. Influence of processing and storage on the phenolic composition of Thompson Seedless grape juice. Journal of Agricultural and Food Chemistry, (1990), 38(7): 1565-1571.

Takoi, K, et al., Identification and characteristics of new volatile thiols derived from the Hop (*Humulus luplus* L.) cultivar Nelson Sauvin. Journal of Agricultural and Food Chemistry, (2009),57, 2493-2502.

Tominaga, T, et al., A New Type of Flavor Precursors in *Vitis vinifera* L cv. Sauvignon Blanc-S-Cysteine Conjugates. Journal of Agricultural and Food Chemistry, (1998), 46, 5215-5219.

Tominaga, T, et al., Identification of new volatile thiols in the aroma of *Vitis vinifera* L. var. Sauvignon Blanc wines, Flavour and Fragrance Journal, (1998), 13, 159-162.

Tominaga, T. et al., Identification de l'acétate de 3-mercaptohexanol, composéà forte odeur de buis, intervenant dans l'arôme des vins de Sauvignon, Vitis, (1996), 35, 207-210.

Roland A. et al., Validation of a nanoliquid chromatography—tandem mass spectrometry method for the identification and the accurate quantification by isotopic dilution of glutathionylated and cysteinylated precursors of 3-mercaptohexan-1-ol and 4-mercapto-4-methylpentan-2-one in white grape juices, Journal of Chromatography A, 1217 (2010) 1626-1635.

Roland A. et al., Distribution of varietal thiol precursors in the skin and the pulp of Melon B. and Sauvignon Blanc grapes, Food Chemistry 125 (2011) 139-144.

International Search Report issued for International Application No. PCT/NZ2021/050090 on Sep. 3, 2021, 9 pages.

De Torres, C. et al., 'Freeze-dried grape skins by-products to enhance the quality of white wines from neutral grape varieties', Food Research International, vol. 69, (2015), pp. 97-105.

Bogner, Jamie, "Brewing Beer with Pomace" May 19, 2018, Retrieved from <https://beerandbrewing.com/brewing-beer-with-pomace/> (3 pages).

Dellinger, Derek, "The Intersection of Wine and Beer", Sep. 2019, Retrieved from <https://byo.com/article/the-intersection-of-wine-and-beer/> (12 pages).

Frühbauerová et al., "Antioxidant Properties of Processed Cheese Spread After Freeze-Dried and Oven-Dried Grape Skin Powder Addition", Potravinarstvo Slovak Journal of Food Sciences, vol. 14 (2020) 230-238.

Cheng et al., "Effect of extraction solvent, waste fraction and grape variety on the antimicrobial and antioxidant activities of extracts from wine residue from cool climate", Food Chemistry 134 (2012) 474-482.

Stojanovic et al., "Development of Semiliquid Ingredients from Grape Skins and Their Potential Impact on the Reducing Capacity of Model Functional Foods", Journal of Food Quality, (2018) vol. 2018, Article ID 1969680, 9 pages.

Putnik et al., "Influence of Acidity and Extraction Time on the Recovery of Flavonoids from Grape Skin Pomace Optimized by Response Surface Methodology", Chem. Biochem. Eng. Q., (2016) 30 (4) 455-464.

Kuck et al., "Microencapsulation of grape (*Vitis labrusca* var. *Bordo*) skin phenolic extract using gum Arabic, polydextrose, and partially hydrolyzed guar gum as encapsulating agents" Food Chemistry, 194 (2016) 569-576.

Bonnaffoux et al., "First identification and quantification of S-3-(hexan-1-ol)-c-glutamylcysteine in grape must as a potential thiol precursor, using UPLC-MS/MS analysis and stable isotope dilution assay", Food Chemistry 237 (2017) 877-886.

Peña-Gallego et al., "S-Cysteinylated and S-glutathionylated thiol precursors in grapes. A review" Food Chemistry 131 (2012) 1-13.

John Holl, "No Wood Required: Making A Wine IPA", Mar. 17, 2018, retrieved from <https:beerandbrewing.com/no-wood-required-making-a-wine-ipa>, 4 pages.

European Search Report issued for European Patent Application No. 21821660.4 on Jun. 18, 2024, 12 pages.

Stan Hieronymus, "The Complex Case of Thiols", Craft Beer & Brewing, Sep. 19, 2018, retrieved from <https://beerandbrewing.com/the-complex-case-of-thiols/>, 6 pages.

J.C. Tetreault, "Trillium's Dialed-In IPA with Wine-Grape Must Recipe", Craft Beer & Brewing, Mar. 6, 2018, retrieved from <https://beerandbrewing.com/homebrew-recipe-trilliums-dialed-in-ipa-with-wine-grape-must/>, 3 pages.

Jamie Bogner, "Brewers' Perspective: Using Grapes in Beer", Craft Beer & Brewing, Mar. 13, 2018, retrieved from <https://beerandbrewing.com/brewers-perspective-using-grapes-in-beer/>, 5 pages.

Jamie Bogner,, "Brewing Beer with Pomace", Craft Beer & Brewing, Mar. 19, 2018, retrieved from <https://beerandbrewing.com/brewing-beer-with-pomace/>, 2 pages.

Jamie Bogner, "Brewing with Wine Grapes", Craft Beer & Brewing, Mar. 5, 2018, retrieved from <https://beerandbrewing.com/brewing-with-wine-grapes/>, 6 pages.

* cited by examiner

GRAPE SKIN COMPOSITIONS AND COMPOUNDS, AND METHODS OF PREPARATION AND USE THEREFOR

RELATED APPLICATION

This application is a Continuation Application of PCT/NZ2021/050090, filed on Jun. 10, 2021, and claims the benefit of New Zealand provisional application 765291 filed 10 Jun. 2020, the entire contents of which are hereby incorporated by reference herein in their entirety.

FIELD

The present disclosure relates to compositions prepared from grape skins, and chemical compounds prepared from grape skins. The present disclosure relates also to methods of preparing such compositions and compounds, and methods of using such compositions and compounds, including methods of preparing beverages, including beers and other fermented drinks.

BACKGROUND

The production of fermented beverages is intrinsically a biotechnological process. The conversion of raw materials into a fermented beverage relies on microbial activity and many different enzymatic reactions.

Traditionally, beer is made from four key ingredients: malted cereals (barley or other), water, hops, and yeast. Cider is traditionally is made from fruit juice and yeast, while kombucha is traditionally produced from fruit juice combined yeast and bacterial cultures. Yet, there is also a movement away from traditional fermentation ingredients and methods, and a trend towards more modern techniques.

The worldwide beer, cider, and kombucha industries have grown at an astonishing rate over the past decade, with the number of new manufacturers rapidly increasing. Microbreweries and craft breweries, in particular, have become increasingly numerous.

However, the widespread availability of craft products also means substantial competition between the various producers, and there is a considerable demand for new and improved consumables. Given this, there is a pressing need for new compositions and new methods for preparing fermented beverages.

SUMMARY

In one aspect, the present disclosure encompasses a method for preparing a composition comprising a grape skin concentrate, the method comprising:
(i) substantially removing flesh and juice components from the skin of white wine grapes,
(ii) directly freezing or chilling the skin of the white wine grapes,
(iii) if frozen, optionally
(1) thawing the skin of the white wine grapes or
(2) thawing the skin of the white wine grapes, soaking in water, and then evaporating the water, and
(iv) substantially drying the skin of the white wine grapes to produce a dried product,
thereby obtaining a composition comprising a grape skin concentrate.
In various aspects:
The white wine grapes are aromatic white wine grapes.
The white wine grapes are selected from the group consisting of: white wine grapes from New Zealand, Australia, South Africa, South America, and any combination thereof.
The white wine grapes are selected from the group consisting of: Sauvignon Blanc, Albariño, Chenin Blanc, Colombard, Friulano, Tocai, Gruner Veltliner, Traminer, Verdicchio, Verdejo, Vermentino, Scheurebe, Maccabeo, Gewürztraminer, Riesling, Muscat, Petit Manseng, Pinot Gris, and Tokay grapes, and any combination thereof.
The white wine grapes comprise Sauvignon Blanc grapes.
The white wine grapes consist essentially of Sauvignon Blanc grapes.
The white wine grapes are Sauvignon Blanc grapes.
The substantially removing of (i) comprises crushing or pressing.
The pressing is performed by a pneumatic press or a basket press.
The pressing is performed with a press setting ranging from about 600 to about 800 litres per tonne.
The pressing is performed with a press setting ranging from about 650 to about 720 litres per tonne.
The method includes addition of at least one antioxidant or preservative before or after (i).
The at least one antioxidant is a sulphite.
The at least one antioxidant is ascorbic acid.
The freezing of (ii) comprises blast freezing.
The chilling of (ii) comprises blast chilling or cryomaceration.
The substantially drying of (iv) comprises freeze drying.
The method further comprises: (v) milling the dried product of (iv) to obtain a milled product.
The milled product comprises a flake or a powder.
The powder is prepared with a sieve size of about 4 mm to about 2 mm.
The method further comprises: (v) formulating the dried product of (iv) to obtain a pellet.
The pellet is formulated to include one or more hops.
The one or more hops are selected from the group consisting of: American, Australian, English, German, New Zealand, and South African hops, and any combination thereof.
The one or more hops are selected from the group consisting of: Nelson Sauvin hops, Hallertau Blanc hops, Tomahawk hops, Simcoe hops, Summit hops, Cascade hops, and any combination thereof.
The one or more hops are selected from the group consisting of: Citra, Chinook, Loral, Mosaic, Amarillo, Centennial, Ekuanot, Sabro, Southern Cross, Pacific Gem, Pacific Jade, Riwaka, Dr Rudi, Wakatu, Wai iti, Waimea, Kohatu, Motueka, Green Bullet, Hort 4337, Hort 9909, Orbit, Rakau, Pacifica, Styrian Golding, Strata, Galaxy, Ella, Enigma, and Vic Secret hops, and any combination thereof.

In one other aspect, the present disclosure encompasses a composition comprising a grape skin concentrate, the grape skin concentrate being prepared according to a preceding aspect.
In various aspects:
The composition is prepared as a flake or a powder.
The powder is prepared with a sieve size of about 4 mm to about 2 mm.
The composition is formulated as a pellet.
The pellet is formulated to include one or more hops.
The one or more hops are selected from the group consisting of: American, Australian, English, German, New Zealand, and South African hops, and any combination thereof.

The one or more hops are selected from the group consisting of: Nelson Sauvin hops, Hallertau Blanc hops, Tomahawk hops, Simcoe hops, Summit hops, Cascade hops, and any combination thereof.

The one or more hops are selected from the group consisting of: Citra, Chinook, Loral, Mosaic, Amarillo, Centennial, Ekuanot, Sabro, Southern Cross, Pacific Gem, Pacific Jade, Riwaka, Dr Rudi, Wakatu, Wai iti, Waimea, Kohatu, Motueka, Green Bullet, Hort 4337, Hort 9909, Orbit, Rakau, Pacifica, Styrian Golding, Strata, Galaxy, Ella, Enigma, and Vic Secret hops, and any combination thereof.

In yet one other aspect, the present disclosure encompasses a composition comprising a grape skin concentrate and one or more hops, the grape skin concentrate being prepared according to a preceding aspect.

In various aspects:

The composition is formulated as a pellet.

The one or more hops are selected from the group consisting of: American, Australian, English, German, New Zealand, and South African hops, and any combination thereof.

The one or more hops are selected from: Nelson Sauvin hops, Hallertau Blanc hops, Tomahawk hops, Simcoe hops, Summit hops, and Cascade hops.

The one or more hops are selected from the group consisting of: Citra, Chinook, Loral, Mosaic, Amarillo, Centennial, Ekuanot, Sabro, Southern Cross, Pacific Gem, Pacific Jade, Riwaka, Dr Rudi, Wakatu, Wai iti, Waimea, Kohatu, Motueka, Green Bullet, Hort 4337, Hort 9909, Orbit, Rakau, Pacifica, Styrian Golding, Strata, Galaxy, Ella, Enigma, and Vic Secret hops, and any combination thereof.

In one further aspect, the present disclosure encompasses a method of making a fermented beverage, comprising:

preparing a mixture comprising yeast, liquid, and composition comprising a grape skin concentrate, wherein the composition comprising the grape skin concentrate is prepared according to a preceding aspect, and fermenting the mixture to obtain the fermented beverage.

In various aspects:

The yeast is selected from the group consisting of: *Saccharomyces, Brettanomyces, Kloeckera, Candida*, and *Hanseniaspora* yeasts.

The yeast is a *Saccharomyces cerevisiae* yeast.

The *Saccharomyces cerevisiae* yeast is a brewer's yeast.

The composition is prepared as a flake or a powder.

The composition is formulated as a pellet.

The pellet comprises one or more types of hops.

The mixture includes one or more types of hops.

The one or more hops are selected from the group consisting of: American, Australian, English, German, New Zealand, and South African hops, and any combination thereof.

The one or more hops are selected from the group consisting of: Nelson Sauvin hops, Hallertau Blanc hops, Tomahawk hops, Simcoe hops, Summit hops, Cascade hops, and any combination thereof.

The one or more hops are selected from the group consisting of: Citra, Chinook, Loral, Mosaic, Amarillo, Centennial, Ekuanot, Sabro, Southern Cross, Pacific Gem, Pacific Jade, Riwaka, Dr Rudi, Wakatu, Wai iti, Waimea, Kohatu, Motueka, Green Bullet, Hort 4337, Hort 9909, Orbit, Rakau, Pacifica, Styrian Golding, Strata, Galaxy, Ella, Enigma, and Vic Secret hops, and any combination thereof.

The fermented beverage is an alcoholic, non-alcoholic, or reduced-alcohol beverage.

The fermented beverage is a beer.

The beer is selected from the group consisting of: barley or other cereal beers, maize beers, millet beers, oat beers, rice beers, rye beers, sorghum beers, and wheat beers.

The beer is selected from the group consisting of: ales, lagers, pilsners, porters, saisons, and stouts.

The beer is an India Pale Ale beer.

The fermented beverage is a beer-wine hybrid or a fruit beer.

The fermented beverage is a cider.

The fermented beverage is a kombucha.

In yet one further aspect, the present disclosure encompasses a fermented beverage made using the method according to a preceding aspect.

In various aspects:

The fermented beverage is an alcoholic, non-alcoholic, or reduced-alcohol beverage.

The fermented beverage is a beer.

The beer is selected from the group consisting of: barley or other cereal beers, maize beers, millet beers, oat beers, rice beers, rye beers, sorghum beers, and wheat beers.

The beer is selected from the group consisting of: ales, lagers, pilsners, porters, saisons, and stouts.

The beer is an India Pale Ale beer.

The fermented beverage is a beer-wine hybrid or a fruit beer.

The fermented beverage is a cider.

The fermented beverage is a kombucha.

The foregoing brief summary broadly describes the features and technical advantages of certain embodiments of this disclosure. Further technical advantages will be described in the detailed description and examples that follow.

Novel features that are believed to be characteristic of the disclosed subject matter will be better understood from the detailed description when considered in connection with any accompanying figures and examples. However, the figures and examples provided herein are intended to help illustrate this subject matter or assist with developing an understanding of this subject matter, and are not intended to limit its scope.

DETAILED DESCRIPTION

The following description sets forth numerous exemplary configurations, parameters, and the like. It should be recognised, however, that such description is not intended as a limitation on the scope of what is disclosed, but is instead provided as a description of exemplary embodiments.

All references, including patents and patent applications, cited in this specification are hereby incorporated by reference. No admission is made that any reference constitutes prior art. Nor does discussion of any reference constitute an admission that such reference forms part of the common general knowledge in the art, in New Zealand or in any other country.

Definitions

In each instance herein, in descriptions, embodiments, and examples of the present disclosure, the terms "comprising", "including", etc., are to be read expansively, without limitation. Thus, unless the context clearly requires otherwise, throughout the description and the claims, the words "comprise", "comprising", and the like are to be construed in an inclusive sense as to opposed to an exclusive sense, that is to say in the sense of "including but not limited to".

The term "consisting essentially of", as used herein, may refer to the presence of a component in a composition. For example, a concentrate may be at least 80% by weight of the composition, or at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, at least 99.5%, at least 99.8%, or at least 99.9% by weight of the composition (% w/w). For liquids, a concentrate may be at least 80% by volume of the composition volume, or at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, at least 99.5%, at least 99.8%, or at least 99.9% by volume of the composition volume (% v/v).

In the present description, the articles "a" and "an" are used to refer to one or to more than one (i.e., to at least one) of the grammatical object of the article. By way of example, "an element" can be taken to mean one element or more than one element.

Throughout this description, the term "about" is used to indicate that a value includes the standard deviation of error for the method being employed to determine the value, for example, levels of compounds or concentration levels, as described in detail herein. In particular, the term "about" encompasses a 10% to 15% deviation (positive and negative) in the stated value or range, particularly 10% deviation (positive and negative) in the stated value or range.

As used herein, "beer" refers to a fermented beverage prepared from cereal grains, or roots, or other plant parts. Different types beers may be flavoured with one or more types of hops. Exemplary beers include but are not limited to various cereal beers (e.g., beers prepared from malted barley), maize beers, millet beers, oat beers, rice beers, rye beers, sorghum beers, and wheat beers, and any combination of these, as well as various ales, lagers, pilsners, porters, radlers, saisons, and stouts. Beer-wine hybrids are also included, that is, beers brewed in combination with one or more wine grapes. Further included are fruit beers, for example, beers brewed in combination with one or more fruits. Other beers are described in detail herein.

"Concentrate", for example, in relation to a grape skin, refers to remaining material where the flesh and juice components of the grape have been partly or substantially removed. In addition to this, seeds and/or stems may be partly or substantially removed. Removal of the flesh and juice components may be by one or more of crushing, pressing, drying, and other means. A concentrate may be prepared as a particular composition, for example, as a paste, flake, cake, tablet, powder, plug, or pellet. Various preparations and methods for obtaining these are set out further below.

Utilised herein "fermented beverage" refers to consumable liquids prepared by yeast fermentation. These include but are not limited to beverages such as beers, beer-wine hybrids (classified as a type of beer), fruit beers, and ciders. Kombuchas are also included. The fermented beverage may be an alcoholic beverage, a non-alcoholic beverage, or a reduced-alcohol beverage. In certain circumstances, wines are specifically excluded as fermented beverages.

As noted herein, "freeze drying" refers to a lyophilisation procedure. It will be understood that the terms "freeze drying" does not exclude the use of higher temperatures (i.e., higher than freezing temperatures). For example, higher than freezing temperatures may be used for removing residual moisture during the secondary drying phase for freeze drying procedures.

"Grape" as used herein encompasses any fruit of the genus Vitus, and any hybrid, cultivar, variety, and genetic derivative thereof. Encompassed, specifically, are wine grapes, including *Vitis vinifera*, and particularly, white wine grapes, including aromatic white wine grapes, such as the particular varietal grapes of Sauvignon wines, including Sauvignon Blanc wines, as well as the varietal grapes of Albariño, Chenin Blanc, Colombard, Friulano (e.g., Tocai), Grüner Veltliner, Traminer, Verdicchio, Verdejo, and Vermentino wines. Also included are Scheurebe, Maccabeo, Gewürztraminer, Riesling, Muscat, Petit Manseng, Pinot Gris, and Tokay wine grapes. Other grapes are described in detail herein. It will be understood that one or more different grapes (or grapes from different regions) may be combined and used.

"Hops" when referring to a beverage additive refers to seed cones (also called flowers or strobiles) of the genus *Humulus*, and any hybrid, cultivar, variety, and genetic derivative thereof. Specifically encompassed are hops of *Humulus lupulus*, and particularly, *H. l.* var. *lupulus*, *H. l.* var. *lupuloides* (e.g., *H. americanus*), *H. l.* var. *cordifolius*, *H. l.* var. *pubescens*, and *H. l.* var. *neomexicanus*. Exemplary hops include but are not limited to American hops and New Zealand hops, as well as hops from Australian, English, French, Belgian, German, South African, or other sources. Hops of interest are set out in this specification, including specific cultivars. It will be understood that one or more different hops (or hops from different regions) may be combined and used. In addition, wet or dry hops may be utilised, or combinations thereof. Particularly noted are whole leaf hops and ingredients obtained from hops, for example, one or more hops extracts, hops powders, hops pellets, hops plugs, and the like.

A "genetic derivative" of a plant refers to offspring, sports, or other cultivars that are obtained from the parent stock. This includes offspring obtained from a genetic cross with the parent, e.g., F1 progeny or F2 progeny.

"Sauvignon Blanc" grapes refer to the specific white wine grapes of *Vitis vinifera* originating from Western France in the Loire Valley and Bordeaux wine regions, but also grown in notable regions of South Africa, Chile, New Zealand, California, Iran, and the Ukraine. "Sauvignon Blanc" is alternatively known as Sauvignon Jaune, Fume Blanc, Blanc Fume, Feigentraube, and Muskat-Silvaner, amongst other names.

"Sulphur compounds" refers to various chemical agents associated with aroma and/or flavour in fermented beverages. These include but are not limited to volatile thiols and their precursors, as well as furanthiols, mercaptans, esters, phenols, and terpenoids.

"Thiols" refer to sulphur compounds that are analogs of an alcohol. Particular thiols of interest include volatile thiols associated with grapes and/or hops. These include but are not limited to 3-mercaptohexan-1-ol (3MH), 3-mercaptohexyl acetate (3MHA), 4-methyl-4-mercaptopentan-2-one (4MMP), 4-mercapto-4-methylpentan-2-ol (4MMPOH), 3-sulfanyl-4-methylpentan-1-ol (3S4MP), 3-sulfanyl-4-methylpentyl acetate (3 S4MPA), 3-mercapto-3-methylbutan-1-ol (3MMB), 3-mercapto-2-methylpropanol (3MMP). Various precursor compounds for volatile thiols are also included, for example, S-3-(hexan-1-ol)-L-cysteine (Cys-3MH), S-4-(4-methylpentan-2-one)-L-cysteine (Cys-4MMP), S-3-(hexan-1-ol)-glutathione (Glut-3MH) and S-4-(4-methylpentan-2-one)-glutathione (Glut-4MMP) for 3MH and 4MMP. In relation to wine grapes, varietal thiols and non-varietal thiols are specifically noted.

As used herein, the term "yeast" refers to one or more strains useful for fermentation. Exemplary yeast strains include but are not limited to *Saccharomyces, Brettanomyces, Kloeckera, Candida,* and *Hanseniaspora* strains. Specifically noted for fermentation are *Pichia kluyveri* strains and *Saccharomyces cerevisiae* strains. Other strains are set out herein below.

Compositions Comprising Grape Skin Concentrates and Associated Chemical Compounds The inventors have found that grape skin concentrates may be prepared and used as beneficial compositions for preparing fermented beverages, such as beers, beer-wine hybrids, fruit beers, and ciders, and also kombuchas. In particular, it has been demonstrated that the skins from white wine grapes, and particularly, Sauvignon Blanc varietal grapes, can be processed to obtain a concentrate useful for enhancing desirable aromas and flavours in fermented beverages.

Grapes, and specifically wine grapes, have been shown to contain sulphur compounds that contribute positively to beverage aromas. Notable amongst these are compounds identified as volatile thiols. See, e.g., Coetzee et al, 2012; Roland et al., 2011; Lund et al, 2009; Ribéreau-Gayon et al, 2006; Tominaga et al, 1998. Volatile thiols are therefore of particular interest for the compositions and methods of the present disclosure. Non-limiting examples of these are set out in Table 1, below.

Typically, grapes have low levels of volatile thiols, and instead contain the corresponding precursor compounds. It is during the fermentation process that yeast convert the various precursor compounds into the volatile thiols, and thereby impart aromas for the final beverage. Non-limiting examples of precursors are set out in Table 2, below.

The three main volatile thiols associated with tropical nuances in wine are 3MH, 3MHA, and 4MMP. 4MMP precursors are found mainly in juice and flesh of grapes. In contrast, 3MH precursors are retained in the skin, particularly when grapes are processed under cooler temperatures and with gentler pressing. With this in mind, the present application proposes methods of preparing and concentrating grape skins while optimising levels of volatile thiols and precursors in these compositions. These compositions, in turn, are useful for enhancing fermented beverages as described in detail herein.

Notably, beers produced with certain hops are also known to contain volatile thiols. Non-limiting examples of these are set out in Table 3, below. Beer hops are also known to produce terpenoids, particularly sulphur-containing terpenoids, which are useful for imparting aromas and flavours. See, e.g., Holt et al., 2019. Therefore, the present disclosure encompasses compositions comprising the grape skin concentrates, as described herein, which may be combined with various hops compositions. Also encompassed are methods of using the various compositions in fermentation. This is set out in detail further below.

Thus, the present disclosure relates generally to a composition prepared from grape skins. Particularly noted are grape skins from wine grapes. Of specific note are grape skins from white wine grapes. While specific compositions prepared from white wine grapes are described herein, that is, Sauvignon Blanc grapes, it is understood that the present disclosure is readily adapted to use with different types of grapes.

TABLE 1

Key volatile thiol compounds from wine grapes

| Key compound | Aroma(s) | Structure |
| --- | --- | --- |
| 3-mercaptohexan-1-ol (3MH) ($C_6H_{14}OS$) also called 3-sulfanylhexan-1-ol (3SH) | passion fruit, grapefruit, gooseberry, guava | |
| 3-mercaptohexyl acetate (3MHA) ($C_8H_{16}O_2S$) also called 3-sulfanylhexyl acetate | passion fruit, grapefruit, box tree, gooseberry, guava | |
| 3-mercapto-3-methylbutan-1-ol (3MMB) also called 3-methyl-3-sulfanylbutan-1-ol | cooked leeks | |
| 3-mercapto-2-methylpropanol (3MMP) | broth, sweat | |
| 4-methyl-4-mercaptopentan-2-one (4MMP) ($C_6H_{12}OS$) also called 4-methyl-4-sulfanylpentan-2-one (4MSP) | box tree, passion fruit, broom, blackcurrant, cat urine | |
| 4-mercapto-4-methylpentan-2-ol (4MMPOH) ($C_6H_{14}OS$) also called 4-methyl-4-sulfanylpentan-2-ol | citrus zest | |

TABLE 2
| Key volatile thiol precursors | |
|---|---|
| Precursor | Structure |
| 3MH precursor (E)-hex-2-enal | 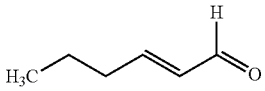 |
| 3MH precursor Glutathionylated precursor (G3MH) | 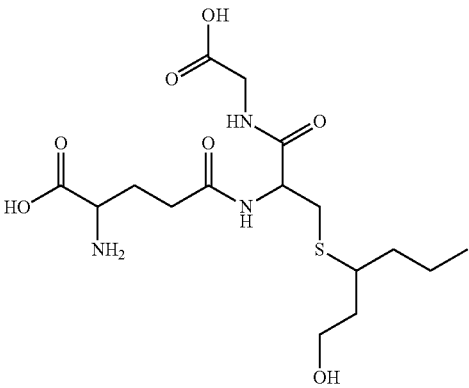 [SMILES: CCCC(CCO)SCC(NC(=O)CCC(N)C(=O)O)C(=O)NCC(=O)O] |
| 3MH precursor Cysteinylated precursor (Cys3MH) | 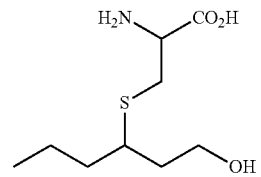 |
| 4MMP precursor Glutathionylated precursor (G4MMP) | 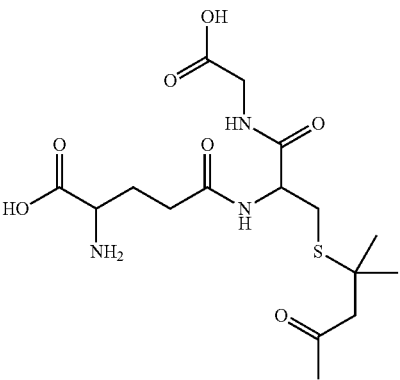 [SMILES: CC(=O)CC(C)(C)SCC(NC(=O)CCC(N)C(=O)O)C(=O)NCC(=O)O] |
| 4MMP precursor Cysteinylated precursor (Cys4MMP) | 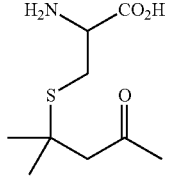 |
| 3MHA precursor 3-mercaptohexan-1-ol (3MH) | 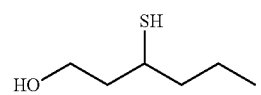 |

TABLE 3

Key volatile thiol compounds from hops

| Key compound | Aroma(s) | Structure |
| --- | --- | --- |
| 3-mercaptohexan-1-ol (3MH) ($C_6H_{14}OS$) also called 3-sulfanylhexan-1-ol (3SH) | passion fruit, grapefruit, gooseberry, guava | |
| 3-sulfanylpentan-1-ol (3SP) | citrus zest and grapefruit | |
| 3-sulfanyl-4-methylpentan-1-ol (3S4MP) | grapefruit and/or rhubarb | |
| 3-sulfanyl-4-methylpentyl acetate (3S4MPA) | grapefruit, peach, and/or rhubarb | |
| 4-methyl-4-mercaptopentan-2-one (4MMP) ($C_6H_{12}OS$) also called 4-methyl-4-sulfanylpentan-2-one (4MSP) | box tree, passion fruit, broom, blackcurrant, cat urine | |

Amongst useful grapes are those that exhibit particular biochemical, taste, and/or aroma similarities to Sauvignon Blanc wine grapes. These include but are not limited to Albariño, Chenin Blanc, Colombard, Friulano (e.g., Tocai), Gruner Veltliner, Traminer, Verdicchio, Verdejo, and Vermentino wine grapes. Other white wine grapes are encompassed, such as those with noted volatile thiol components. These include but are not limited to Chardonnay, Gewurztraminer, Gros Manseng, Koshu, Maccabeo, Muscat, Muscadet, Petit Arvine, Petit Manseng, Pinot Blanc, Pinot Gris, Riesling, Scheurebe, Semilion, Sylvaner, and Tokay wine grapes. Red wine grapes with noted volatile thiol components are also encompassed. Such include but are not limited to Cabernet wine grapes, such as Cabernet Franc and Cabernet Sauvignon, and Carignan, Grenache, Malbec, Merlot, Pinot Noir, and Syrah wine grapes. Any combination of the above may also be used.

In one particular aspect, the composition is prepared from *Vitis vinifera* Sauvignon wine grapes, for example, Sauvignon Blanc wine grapes, or one or more of the other grapes described herein. In other aspects, one or more genetic derivatives from this plant/these plants may be used. For example, it may be desirable to use F1 or F2 progeny from a genetic cross that includes the parent stock of the plant. Alternatively, any sports or other cultivars obtained from the parent may be used. It may be desirable to source the grapes from Europe, for example, from France or Germany; from America, for example, from California; from Australia; from New Zealand; from South Africa; or from South America, for example, from Chile. A combination of grapes from different sources may also be used.

The composition is preferably formulated to comprise a grape skin concentrate. It will be understood that the concentrate is prepared from the solid remains of the grapes after crushing or pressing. The concentrate will encompass the skins and, optionally, the seeds and/or stems of the grapes. Accordingly, the composition may be prepared in dried or semi-liquid form. The composition may be formulated, for example, as a flake, powder, pellet, plug, tablet, capsule, syrup, suspension, gel, pomace, puree, paste, or as drops. The composition may be provided in sachet form, for example, a powder sachet.

In certain aspects, it may be desirable to formulate the grape skin composition into a dried product. Noted formulations include flakes, pellets, plugs, tablets, and capsules. The capsules may include powdered contents. The powder may be provided in free flowing form or as a solid cake. The composition may be provided as a powder for forming a suspension, powder for forming a solution, bulk granules, or bulk powder. In certain circumstances, the dried product may be combined with one or more liquids to re-constitute as a liquid or semi-liquid composition. Other formulations are also possible, as described herein.

As particular examples, the composition of the present disclosure may be combined with one or more hops or one or more ingredients obtained from hops. For example, the composition may be formulated as a powder, pellet, or plug, and may include a combination of grape skin concentrate along with hops, hops extract, and/or hops powder. Alternatively, the composition may include a grape skin concentrate combined with whole leaf hops or wet hops. It will be understood that one type of hops may be used for such combinations, or different types of hops may be used together. The hops may be obtained from one or more sources, such as American, Australian, English, German, New Zealand, or South African hops. New Zealand hops, such as Nelson Sauvin, are particularly useful. Other useful hops include but are not limited to: Hallertau Blanc, Tomahawk, Simcoe, Summit, and Cascade hops, as well as Citra, Chinook, Cryo Pop (from YCH), Loral, Mosaic, Amarillo, Centennial, Ekuanot, Sabro, Southern Cross, Pacific Gem, Pacific Jade, Riwaka, Dr Rudi, Wakatu, Wai iti, Waimea, Kohatu, Motueka, Green Bullet, Hort 4337, Hort 9909, Orbit, Rakau, Pacifica, Styrian Golding, Strata, Galaxy, Ella, Enigma, and Vic Secret hops.

The composition may contain one or more additional ingredients, for example, one or more binders, disintegrants, flavours, colours, sweeteners, flow agents, anti-caking agents, sorbents, including one or more antioxidants/preservatives as described herein. Useful ingredients include but are not limited to: stearin, magnesium stearate, and stearic acid; saccharides and their derivatives, e.g., disaccharides: sucrose, lactose; polysaccharides and their derivatives, e.g., starches, cellulose or modified cellulose such as microcrystalline cellulose and cellulose ethers such as hydroxypropyl cellulose; sugar alcohols such as isomalt, xylitol, sorbitol and maltitol; proteins such as gelatin; synthetic polymers such as polyvinylpyrrolidone, polyethylene glycol; fatty acids, waxes, shellac, and plant fibres, e.g., corn protein zein; hydroxypropyl methylcellulose; crosslinked polymers, e.g., crosslinked polyvinylpyrrolidone (crospovidone), and crosslinked sodium carboxymethyl cellulose (croscarmellose sodium); sodium starch glycolate; silicon dioxide, fumed silica, talc, and magnesium carbonate.

In certain aspects, the composition of the present disclosure may include a significant level of grape skin concentrate. As exemplifications, the percentages of concentrate in the composition may range from at least 75% to at least 95% grape skin concentrate; or at least 85% to at least 95% grape skin concentrate; or at least 90% to at least 95% grape skin concentrate in the composition (w/w). The composition may consist essentially of grape skin concentrate as described herein. Where combined with hops (or ingredients obtained from hops, for example, hops powder or hops extract), the percentages of concentrate in the composition may range from at least 15% to at least at least 45% grape skin concentrate; or at least 25% to at least 45% grape skin concentrate; or at least 35% to at least 45% grape skin concentrate in the composition (w/w). Similarly, the percentages of hops or hops ingredients in the combination may range from at least 15% to at least at least 45% grape skin concentrate; or at least 25% to at least 45% grape skin concentrate; or at least 35% to at least 45% grape skin concentrate in the composition (w/w).

It is expected that the composition of the present disclosure will include one or more of the beneficial sulphur compounds from wine and/or hops. As noted, volatile thiol compounds are of particular interest for the composition, and specifically, 3MH, 3MHA, and 4MMP, and their precursors. As examples, the composition may include concentrations of one or more volatile thiols (e.g., one or more of 3MH, 3MHA, 4MMP, and/or their precursors) ranging from at least 10 to at least 1000 ng/kg; or at least 40 to at least 800 ng/kg; or at least 100 to at least 700 ng/kg; or at least 500 to at least 600 ng/kg; or concentrations of at least 50 ng/kg, at least 100 ng/kg, at least 500 ng/kg, at least 1000 ng/kg, at least 5000 ng/k, or at least 10,000 ng/kg. In certain circumstances, it may be desirable to supplement the sulphur compounds present in the composition. In particular, purified sulphur compounds may be introduced to the composition, including purified volatile thiols such as one or more of 3MH, 3MHA, and 4MMP, and/or their precursors.

In relation to this, it will be understood that other known assays may also be used to analyse the disclosed compositions, and the present disclosure is not limited to one particular assay for bioactive compounds. Components suitable for analysis include but are not limited to sulphur compounds, for example, volatile thiols and their precursors, as well as phenolics, antioxidants, carbohydrates, etc. It will be understood also that the levels of components can be determined for solid forms of the concentrates and also can be readily determined for liquid forms of the concentrates. Exemplary methods include but are not limited to column chromatography, gas chromatography, e.g., gas chromatography-mass spectrometry (GC-MS), liquid chromatography, e.g., high-performance liquid chromatography (HPLC), spectrophotometry, e.g., FTIR spectrophotometry, and affinity chromatography.

It has already been noted that the composition of the present disclosure finds particular use for preparing fermented beverages. Methods of preparing and using the disclosed compositions are set out in detail below.

Methods of Producing Compositions Comprising Grape Skin Concentrates

This disclosure relates generally to a composition prepared from grape skins. Particularly noted are grape skins from wine grapes. Of specific note are compositions prepared using grape skins from white wine grapes, such as Sauvignon Blanc wine grapes. Yet, it will be understood that various types grapes and compositions obtained therefrom are also encompassed by the present disclosure.

As an overview of the preparation process, grape skins are obtained by crushing and/or pressing grapes, and partly or substantially removing the juice and flesh from the grape skins. Following this, the grape skins are frozen or chilled. For example, blast freezing or blast chilling may be used. If frozen, the grape skins may be thawed. Following this, the skins are substantially dried to produce a dried product. For example, freeze drying may be used alone or in combination with other drying methods. This dried product, in turn, be further processed to produce a flaked, powdered, or pelletised product. In various aspects, the grape skin concentrate may be prepared to include grape seeds and/or stems, or alternatively, the method can include one or more steps to remove grape seeds and/or stems. Remaining juice after the removal step may be minimised by evaporation, for example, air drying may be used. Remaining juice may also be removed by centrifugation under vacuum. It is preferable to avoid heating during the removal and drying steps.

In initial preparatory stages, the grapes may undergo a pre-treatment process which may include the well known steps of ripening, inspecting, grading, and/or sorting of the grapes. With regard to ripening, it is preferable to use ripe or mature grapes when producing the compositions. Ripeness can be assessed using widely known and used methods in the art. For example, relevant measurements for ripe grapes may range from about 21.7° Bx/12 degree Baumé/93° Oe to about 27.1° Bx/15 degree Baumé/119° Oe. For ripe grapes, particular Brix measurements may be at least about 22° Bx, at least about 23° Bx, at least about 24° Bx, at least about 25° Bx, at least about 26° Bx, or at least about 27° Bx. As exemplifications, grapes may be harvested at a range of about 21 to about 22° Bx. As an alternative, ripeness may correlate to a titratable acidity level between about 0.60-0.99% to about 0.65-0.95%. As a further alternative, ripeness may correlate to a Brix to TA ratio from about 30:1 to about 35:1. Ripeness can be measured prior to picking or processing the grapes. In certain circumstances, overripened grapes may be used.

As part of the processing, the grapes or grape skins may be cleaned and/or sterilised. The grapes may be passed through an assembly having one or more roller brushes for removing dirt or other foreign matter. Conventional washing techniques may be employed. For example, a series of spray nozzles may be used. Wash additives aiding cleansing or reducing the bacteria count may be employed according to local regulations and requirements. As exemplifications, the grapes may be washed by a chlorine wash and/or an ozone impregnated water wash followed by a freshwater rinse.

For processing, the grapes may be conveyed into a hopper. This can be tapered to form a funnel to direct the grapes for pressing. Pressing may be performed with or without a machine. Machine pressing may be accomplished by vertical style pressing, e.g., basket press devices, or horizontal style pressing, e.g., airbag or bladder devices. Other devices include membrane presses, moving head presses, screw presses, impulse presses, and belt presses. Tank presses may also be used. Pressing may be adapted to be performed continuously or in batches. It may be desirable to remove stems prior to pressing by a destemmer/crusher. Alternatively, whole cluster pressing can be used, where the grapes are pressed while still attached to the stems.

The pressing methods may be adapted to apply different levels of force to the grapes as needed. See, e.g., Maggu et al., 2007. As exemplifications, pressures of about 0.4 atm to about 2.4 atm; or about 0.8 atm to about 2 atm; or about 1 atm to about 1.5 atm; or about 0.4 atm, about 0.8 atm, about 1 atm, about 1.2 atm, about 1.4 atm, about 1.8 atm, about 2 atm, about 2.2 atm, or about 2.4 atm may be used for pressing. Pressing may utilise a press setting that ranges from about 500 to about 900 litres per tonne, or about 600 to about 800 litres per tonne, or about 710 to about 760 litres per tonne. Noted settings are at about 720 to about 750 litres per tonne. Pressing may be performed, for example, by a pneumatic press or a basket press. In certain aspects, processing can be relatively gentle ("soft pressing") compared to conventional pressing techniques. For example, with soft pressing, e.g., pressing set at 650 to 720 litres per tonne or less, there is reduced fragmentation of the skin. In particular, it may be desired that only a minor proportion (generally less than 20%) of skin is fragmented by this process. As an exemplification, a gentle press cycle may be used with an inert gas to avoid oxidisation of the material. Amongst available commercial presses, Bucher Inertys systems may be used, e.g., Bucher XPlus 22 to 80 or Bucher XPert 100 to 450. Computerised systems may be used to control the exact pressure being applied to the grapes and the number of cycles applied. See, e.g., J. Robinson (ed) The Oxford Companion to Wine Third Edition, 2006, pages 285-286, 545-546, 767.

To ensure minimal degradation of ingredients, the preparation process may be performed at a temperature of less than 20° C. In various embodiments, the process is performed at a temperature ranging from −4° C. to 20° C.; or from −1° C. to 15° C.; or from 1° C. to 12° C.; or at about 0° C., about 1° C., about 2° C., about 3° C., about 4° C., about 5° C., or about 6° C. These temperatures may be kept during the preparation process, including the storage of the grapes, prior to being broken open, and during the crushing or pressing process. For example, these temperatures may be kept at least from the point that the grapes have been broken open. Use of such temperatures can reduce oxidation of the grapes and the minimise the use of reducing agents.

Alternatively, or along with these reduced temperature, antioxidants or other preservatives may be added to the grapes or grape skins to retain freshness. As exemplifications, sulphites may be used, e.g., sulphur dioxide. Other examples include but are not limited to sorbic acid, sodium sorbate, potassium sorbate, potassium metabisulphite, citric acid, ascorbic acid, malic acid, tartaric acid, propionic acid, and benzoic acid, for example, in the form of its sodium salt, e.g., sodium benzoate. Any combination of antioxidants/preservatives may be used. Specifically noted are combinations of sulphur dioxide and ascorbic acid. Noted also are combinations of potassium metabisulphite and ascorbic acid. The grape skin concentrate may include, for example, less than 1% of a preservative, e.g., about 0.005% to about 0.5%, or about 0.05% to about 0.15%, or may include about 0.04%, about 0.06%, about 0.08%, about 0.1%, about 0.12%, about 0.14%, about 0.16%, about 0.18%, or about 0.2% of a preservative (w/w).

As specific exemplifications, sulphur dioxide may be added to achieve levels ranging from about 25 to about 55 ppm, or about 30 to about 50 ppm, or about 35 to about 45 ppm in the crushed or pressed grape skins. Preferably, sulphur dioxide levels are less than 300 mg/kg. As other exemplifications, potassium metabisulphite may be added at about 50 to about 70 g per tonne of grapes or pressed grapes, or at about 55 to about 70 g per tonne, or at about 65 to about 68 g per tonne. As further exemplifications, ascorbic acid may be added at about 15 to about 45 parts per tonne of grapes or pressed grapes, or at about 20 to about 35 parts per tonne, or at about 25 to about 35 parts per tonne.

In certain aspects, the antioxidant(s) or other preservative(s) is/are added prior to pressing or crushing, or at least within 10-20 minutes of pressing or crushing. It is also possible to combine antioxidant or preservative agents to increase overall antioxidant activity. To further reduce oxidation, it is possible to use de-oxygenation and inert gas purging. In particular, carbon dioxide and/or nitrogen gas may be introduced during the pressing or crushing process. For example, nitrogen flushing may be used during pressing. It is also possible to add one or more fining agents before, during, or after the pressing or crushing process to protect sulphur compounds. For example, one or more animal or soil components, or one or more synthetic components, may be used as fining agents, including casein, skim milk, egg white (e.g., egg albumin), gelatin, isinglass, bentonite, carbon, and polyvinylpolypyrrolidone (PVPP). In particular aspects, copper may be specifically avoided.

In some circumstances, it may be desirable to adjust the pH of the grape skins or that of the final composition to approximate levels used in fermentation. In particular, it may be useful to obtain a pH range from about 5.0 to about 7.0; or about 5.0 to about 6.5; or about 5.0 to about 6.0; or about 5.0 to about 5.5; or a pH of about 5.1, about 5.2, about 5.3, about 5.4, about 5.5, about 5.6, about 5.7, about 5.8, about 5.9, or about 6.0.

In particular aspects, the grape skins are chilled or frozen directly after removal of the juice and flesh to maintain freshness. Chilling or freezing may also be carried out within 1-2 hours or within 12-24 hours of removal, as needed. Blast chilling and blast freezing are particularly useful methods. As exemplifications, chilling temperatures may range from about 1° C. to about 12° C., about 2° C. to about 10° C., about 4° C. to about 6° C., or may be about 5° C., while freezing temperatures may range from about −20° C. to about 0° C., or about −15° C. to about −5° C., or about −18° C. to about −8° C., or may be about −10° C. For example, a must chiller may be set to about 11° C. to about 13° C. Other useful methods utilise 360° freezing or chilling and/or ACVCS next generation freezing technology. Once frozen or chilled, the skins can be stored under these conditions until required. Frozen grape skins can be thawed for drying or may be dried directly by freeze drying.

In certain circumstances, cryomaceration may be used as a chilling methodology. For example, following crushing or pressing, the grape skins may be exposed to low or cold temperatures for more than 1 hour. Exemplary temperatures include about 4° C. to about 15° C., about 5° C. to about 15° C., about 6° C. to about 12° C., about 8° C. to about 12° C., or about 10° C. The duration may be dependent on the temperature, for example, from about 2 hours up to 7-14 days. The cooling may utilise cryogens/coolants such as solid carbon dioxide (dry ice), liquid carbon dioxide, or nitrogen. Notably, the cold shock from cryomaceration produces a larger volume of water in the grape skins and the weight of the skins helps to break up the cellular membrane (cell cracking).

In a particular exemplification, grapes may be quickly frozen and then slowly thawed. For example, the grapes may be frozen to about −30° C. to about −10° C., or about −25° to about −15° C., or to about −20° C. (−4 F), using one or more cryogens, such as dry ice, and then thawed, for example, over about 18 hours, over about 20 hours, over about 24 hours, over about 36 hours, or over about 48 hours. In particular aspects, the process may be carried out so as to maximise ice crystals formation, to damage the grape skin tissue, and enhance levels of beneficial sulphur compounds such as volatile thiols and their precursors. It is also possible to utilise an extraction process, e.g., water extraction, for the thawed grape skins. See, for example, Jelley et al., 2016; Jelley et al., 2020. As one specific option, the grapes may be frozen, thawed, and then soaked in water. The water may then be removed. For example, evaporation can be used to remove the water (e.g., a rotary evaporator may be used). The water may also be removed by filtration prior to evaporation. For example, one or more of pad filters, mesh filters, centrifuge filters, or other brewing filters may be used. The resulting extraction product (e.g., paste product) can be dried and milled as described below. Without wishing to be bound by theory, it is believed that the soaking process may assist with extraction of Cys-3SH and GSH-3SH thiol precursors from the grape skins.

It is expected that the grape skins will be substantially dried following chilling or freezing. Drying will include freeze drying and may also involve other methodology. For example, evaporation may be used in combination with freeze drying. Freeze drying techniques are widely known and commonly used. The freeze drying process may range from 5 to 60 hours; or 10 to 50 hours; or 15 to 40 hours; or about 20 to about 30 hours. Noted for freeze drying are ranges of about 23 to about 27 hours, or about 24 to about 26 hours. Importantly, freeze drying may be utilised to retain the beneficial compounds in the grape skins, for example, terpenes and key C6 compounds, including volatile thiols and their precursors, as described in detail herein.

It may be desirable to use a particular freeze drying process for obtaining the dried product. See, e.g., de Torres et al., 2015. For example, a drying program may be used as part of an automated drying system. The process may include multiple drying steps, e.g., with step wise increases and reductions in temperature. Preferably, a primary drying setting is used for sublimation, followed by one or more secondary drying settings that are used to remove residual moisture. In particular aspects, the top temperature of the process does not exceed 35° C., or alternatively, the top temperature does not exceed 50° C. In other aspects, the temperature of the drying process ranges between −10° C. to 70° C. In one other aspect, at least 24 hours of dying is utilised. As specific exemplifications, chamber batch drying or continuous tunnel drying may be used, for example.

In certain aspects, an additive may be used to accelerate or otherwise assist the drying process. For example, pea starch or other drying aids may be utilised. In addition, the dried products may be made to be cold water soluble. The resulting dried product may then be milled into a flake or powder form. Useful powders may have a sieve size of about 1 mm or less. Milling methods are well known and widely used in the art. Standard mesh sizes may be used to produce the powder, for example, US 20, US 23, US 30, US 35, US 40, US 45, or US 50 mesh sizes may be used. The sieve size for the powder may range from 8 mm to 0.3 mm; or 4 mm to 0.4 mm; or 4 mm to 1 mm; or may be about 4.0 mm, about 3.15 mm, about 3 mm, about 2.8 mm, about 2 mm, about 1 mm, about 0.84 mm, about 0.71 mm, about 0.59 mm, about 0.5 mm, about 0.47 mm, about 0.465 mm, about 0.437 mm, about 0.4 mm, about 0.355 mm, or about 0.3 mm Powder may be packaged into nitrogen flushed bags to protect against oxidation, for example, 0.5 kg to 30 kg bags, or 1 kg to 20 kg bags.

It will be understood that the grape skin composition disclosed herein may be utilised on its own. In addition, as noted herein, the composition of the present disclosure may be combined with one or more hops or one or more ingredients obtained from hops. As exemplifications, the composition that includes hops or hops ingredient(s) may be formulated as a powder, pellet, or plug. In certain aspects, hops products may be prepared so as to be intermixed with grape skin concentrate. For example, grape skin concentrate powder may be added during preparation of hops pellets or hops plugs to produce a combined product, or grape skin concentrate powder may be added with hops powder to produce a combined product. In other aspects, hops or hops ingredients may be modified with grape skin concentrate. For example, whole leaf hops, hops plugs, or hops pellets may be dipped, rolled in, or dusted with grape skin concentrate powder to produce a combined product. The various combination products provide for hybrid pellets having hops components and grape skin components, having desirable levels of aromatic compounds, and having synergistic properties in the fermentation. As particular examples, grape skin concentrate composition obtained from New Zealand Sauvignon Blanc wine grapes may be pelletised with American, German, or English hops, or alternatively, Australian, New Zealand, or South African hops, or any combination of these. These exemplifications are provided as illustrations only, and other combinations are considered to be encompassed by this disclosure.

Methods of Using Compositions Comprising Grape Skin Concentrates

The inventors have found that compositions comprising grape skin concentrates include chemical compounds that are useful for the preparation of fermented beverages such as beers, beer-wine hybrids, fruit beers, and ciders, as well as kombuchas. Particularly noted are the sulphur compounds such as volatile thiols, such as 3MH, 3MHA, and 4MMP, and their precursors. Therefore, it is expected that the beverages produced according to the present disclosure will include beneficial levels of sulphur compounds, including volatile thiols and their precursors. As non-limiting exemplifications, the beverage may include at least 50 ng/L to at least 12,000 ng/L 3MHA; and/or at least 150 ng/L to at least 20,000 ng/L 3MH; and/or at least 5 ng/L to at least 100 ng/L 4MMP.

For producing the beverages of the present disclosure, various organisms may be used. Brewer's yeasts that are useful for fermentation are particularly noted. Exemplary yeasts include *Saccharomyces* yeasts, for example, *Saccharomyces cerevisiae*. Other yeasts include but are not limited to *Brettanomyces, Candida, Hanseniaspora, Kloeckera,* and *Pichia* yeasts, for example: *B. bruxellensis, B. custersii, B. lambicus, B. intermedius, B. anomalus, C. stellata, C. zemplinina, C. pulcherrima, H. uvarum, H. osmophila, H. guilliermondii, K. apiculata, K. javanica, K. cortices, P. kluyveri,* and *S. pastorianus, S. uvarum,* amongst others. Included also are *Dekkera anomala, Naumovozyma*

*dairenensis*, and *Debaryomyces* spp. yeasts. Yeast strains that maximise volatile thiol production are particularly noted, for example, *S. cerevisiae* and *P. kluyveri* strains. For kombucha, both yeast and bacterial cultures may be used, e.g., yeast such as a *Zygosaccharomyces, Candida, Torulaspora, Pichia, Brettanomyces/Dekkera, Schizosaccharomyces*, and/or *Saccharomyces* strains (as examples, *Saccharomyces cerevisiae* or *Zygosaccharomyces kombuchaensis*) along with bacteria, such as *Komagataeibacter* and/or *Gluconobacter* strains (as examples, *Komagataeibacter xylinus* or *Komagataeibacter kombuchae*). Combinations of any of the above organisms, including specific combinations with *S. cerevisiae* may also be used.

Useful strains will include effective thiol producing strains, for example, strains that produce volatile thiols (e.g., 3MH or 4MMP) from corresponding precursor compounds, or strains that can create the volatile thiols from other compounds. Other useful strains may convert 3MH to 3MHA, or produce other chemical conversions in relation to volatile thiol molecules. It is also possible to include inactive yeasts that are rich in glutathione, as a protection from oxidation. Specific *S. cerevisiae* strains include, but are not limited to: L2056, NT116, VIN7, VIN13, VL3, X5, and QA23 strains. Commercially available strains may be obtained, for example, from Wyeast, White Labs, Fermentis, and other suppliers. Particular strains of interest include Wyeast 1318 London Ale III™ yeast, as well as Wyeast 1056 American Ale yeast; and also WLP066 London Fog Ale yeast and WLP518 Opshaug Kveik Ale yeast from White Labs; along with SafAle™ S-33, SafAle™ K-97, and SafAle™ S-04 from Fermentis; and OYL-061 Voss Kveik yeast from OMEGA. Also noted are Berkeley Labs thiol yeast, Lallemand Lalbrew yeast, and other yeast with increased levels of β-glucosidase or β-lyase activity. Any mixture of any of the above strains can also be used to maximize production and conversion levels.

For preparing fermented beverages, particular ratio amounts of the grape skin composition and the hops may be used. As exemplifications, ratio amounts of about 2.5 to about 1; about 2 to about 1; about 1 to about 1; about 1 to about 0.75; about 1 to about 0.5; about 1 to about 0.25 of grape skin composition to hops may be employed. The grape skin composition may be added when fermentation is already in progress. For example, the grape skin composition may be added to a wort stream at about 4 degrees Plato to about 8 degrees Plato, or at about 5 degrees Plato to about 7 degrees Plato. Upon addition of the grape skin composition, fermentation can then be continued, e.g., at temperatures of about 18° C. to about 22° C., or about 19° C. to about 21° C. As one specific option, the grape skin composition may be added before the start of fermentation, for example, during the boiling phase or whirlpool phase for brewing.

In certain circumstances, it may be desirable to enrich the levels of beneficial sulphur compounds that are available during fermentation. In particular, purified sulphur compounds may be introduced prior to or during fermentation, including purified volatile thiols such as one or more of 3MH, 3MHA, and 4MMP, and/or their precursors. Purified compounds may also be introduced after fermentation, to supplement the levels of beneficial sulphur-containing components in the final beverage. It will be understood that the levels of sulphur compounds, for example, volatile thiols and their precursors, as well as phenolics, antioxidants, carbohydrates, etc, may be monitored before, during, and/or after fermentation. Various measurement methodologies can be used, as described here.

To maintain maximal levels of sulphur compounds, including the levels of volatile thiol compounds and their precursors, it is possible to use fining agents to negate metal catalysts and residual polyphenols during fermentation. Exemplary agents are noted herein. It is also possible to use de-oxygenation and inert gas purging during fermentation. For example, carbon dioxide and/or nitrogen gas may be introduced. In addition, it is possible to include one or more antioxidants/preservatives before, during, or after fermentation. Non-limiting examples of these compounds are provided herein.

One or more enzymes may also be used to optimise pressing and maximise aromatic compounds. For example, one or more pectolytic enzymes may be used. This includes commercially available enzymes such as those of LAFAZYM® PRESS. Also noted are aroma enhancing enzymes such as Rapidase® Expression Aroma enzymes and Lallemand Aromazyme™ enzymes. Furthermore, it is possible to use higher fermentation temperatures (irrespective of yeast strain(s) used) to increase the release volatile thiols by yeast strains. For example, temperatures of at least 17° C., at least 18° C., at least 19° C., at least 20° C., at least 23° C., at least 25° C., at least 27° C., at least 30° C., at least 33° C., at least 35° C., or at least 37° C. can be used, for at least part of the fermentation period. In particular, Kveik yeast fermentations can be carried out from about 30 to about 37° C. It is also possible to reduce temperatures for the later stages of fermentation (e.g., reduction to about 15° C. to about 16° C.) to preserve the volatile compounds that have been released.

Following fermentation, the beverage will be ideally chilled and stored at low temperatures to minimise oxidation reactions, and also to reduce hydrolysis reactions converting 3MHA TO 3MH. It would therefore be preferable to keep the beverage at a temperature as low as possible without freezing during the time periods following fermentation, prior to bottling (or canning or kegging), and prior to consumption. Exemplary temperatures include but are not limited to temperature of less than 16° C., less than 15° C., less than 14° C., less than 12° C., less than 10° C., less than 8° C., less than 6° C., or less than 4° C. It is also preferably to carry out bottling, canning, or kegging as quickly as possible following fermentation, to reduce oxygen exposure.

It will be understood that the compositions of the present disclosure are useful for the preparation of various fermented beverages. Included amongst these are beers, such as beers made from cereals (e.g., barley malt), maize, millet, oats, rice, rye, sorghum, or wheat, or any combination of these. Specifically included are ales such as amber ales, Belgian style ales, blonde ales, brown ales, sour ales, wild ales, and also pale ales, such as American Pale Ale, India Pale Ale, and New Zealand Pale Ale; bocks, such as German bocks; lagers, such as pale lagers and dark lagers, as well as Vienna lagers; pilsners; porters, such as Baltic porters; radlers; saisons; session beers; and stouts, including Irish stouts and Imperial stouts. Particular ales of interest include Hazy IPAs, New England IPAs, Double IPAs, Triple IPAs, Sour IPAs, Fruit IPAs, Oat Cream IPAs, Milkshake IPAs, and Tropical IPAs. Other beers include weissbier, Berliner weisse, witbier, maibocks, English bitter, Biere de Garde, marzen, dunkel, dunkelweizen, and doppelbock beers.

Included also are various beer-wine hybrids, for example, beers brewed in combination with one or more types of wine grapes. White wine grapes are noted, in particular, for beer-wine hybrids. For example, Sauvignon Blanc grapes may be used or any other white wine grape, including those described herein, and any combinations of these. Also included are various ciders, such as dry ciders, and specifically including cloudy and clear ciders, and single and multiple fruit ciders, for example, ciders comprising juice from one or more of: crab apples, apples, pears, kiwifruits, and berries, such as strawberries, blackberries, raspberries. Various fruit beers are further included, such as beers brewed with one or more fruits, for example, guavas, mangos, papayas, passionfruit, pineapple, plums, peaches, apricots, citrus, cherries, and berries, including Boysenberries, blueberries, raspberries, strawberries, and any combination of the preceding. Fruit may be introduced during beermaking via whole fruits, fruit parts, fruit juice, fruit purees, fruit extracts, or other means, and may act as an adjunct or flavouring for the beer. Kombuchas are included as well, e.g., kombuchas flavoured with one or more fruit juices and/or one or more spices. It will be understood that these are exemplifications, only, and other types of beers, beer-wine hybrids, fruit beers, ciders, and kombuchas will be known and well within the purview of the skilled person.

With the grape skin concentrate provided as part of a beneficial composition (e.g., powder, flakes, etc), this provides an ideal ingredient for use in the fermentation process. In particular, the composition of the present disclosure provides a stable source of volatile thiols and their precursors, which can be introduced into the fermentation process to increase highly desirable aromatic compounds (e.g., tropical, fruity, etc) in a finished beverage. The production of beers, beer-wine hybrids, fruit beers, and ciders is specifically envisioned, along with production of kombuchas. For example, to brew highly aromatic beer, it is possible to use the grape skin concentrate composition as a replacement for hops, i.e., fermentation without the addition of hops. Alternatively, at least one hops in combination with at least one grape skin concentrate composition may be introduced to the active fermentation. In various alternatives, the hops may be combined with the grape skin extract composition before or upon introduction to fermentation mixture, and the hops may be provided in whole leaf form or as a hops ingredient, e.g., hops powder, hops extract, hops pellet, or hops plug. In one particular aspect, the introduction may be carried out as part of a dry hops addition. Notably, the combination of hops and grape skin extract being introduced into the active fermentation allows for the biotransformation of aromas and flavours.

EXAMPLES

The examples described herein are provided for the purpose of illustrating specific embodiments and are not intended to limit this disclosure in any way.

Example 1: Process for Producing Grape Skin Compositions

Materials and Methodology

High thiol content grapes were sourced from Nautilus Estate in Marlborough, New Zealand. Predominately Sauvignon blanc MS clone (UCD Clone 1) were used, alongside Bordeaux clones (Clone 316 and 317). Blocks noted for their historically high thiol content were selected, and harvested using a Gregoire and Pellenc machine destemming harvesters. The grapes were harvested between 21.5 and 22 degrees Brix. During the harvesting, potassium metabisulphite was dosed at 66 grams per tonne and added to the destemmed grapes. The grapes were put through a crushing machine with 30 parts per tonne ascorbic acid and 20 ml per tonne of enzymes added (pectolytic enzymes). The crushed grape must was then transferred through a must chiller set to 12° C. and into a holding tank for 1 to 8 hours.

A 150 HL Diemme open screen press was used to extract and separate the juice from the skins. The press operated at a maximum pressure of 2 bar over a 150 to 180 minute long press cycle. The press operated at an ambient temperature with the grapes added at 12° C. and remaining at a similar temperature throughout pressing. Three lots of skins were carefully collected and frozen immediately post press. One at 720 litres per tonne, one at 750 litres per tonne, and the other after a full press cycle as straight 'marc'. The skins were collected immediately from the press into plastic lined bins and given an additional dose of potassium metabisulphite and ascorbic acid (same dosages of each, as noted above). The bins of skins were kept in a cold room at 0° C. until collected in a refrigerated truck and transferred to a freezer facility where by they were frozen at −20° C.

The frozen skins were thawed gently over a 24 hour period at ambient temperatures, until in a free form, pliable state, then freeze dried over a period of 24-26 hours, with a maximum temperature of 50° C. held at the end of the run for 3-4 hours. The powder was dried to an average moisture content of 12%, with the yield of raw material in to finished powder averaging 34%. The resulting product was milled into a powder through a 3 mm mesh. The powder was bagged in nitrogen flushed mylar bags containing 1 kg, 10 kgs, or 20 kgs amounts.

Results

The finished powder was pale green in colour, smooth, with a texture like fine grain or sand. The finished powder was analysed and found to be free of pathogen such as *E. coli, Listeria, Salmonella* and faecal coliforms. The powder contained total sugars between 30.9 g/100 g and 38.8 g/100 g. This included essentially equal portions of fructose and glucose.

Example 1A: Extraction Process

In an alternative finishing process, the thawed grape skins (see Example 1) were added to a volume of pure water between 2 to 6 times the volume of grape skins. The mixture was stirred at room temperature for 1 hour and left to settle for 10 minutes. After that, the liquid was filtered from the solids by use of a brewing filter. The resulting solvent liquid was then removed in vacuo, followed by drying under high vacuum. The resulting product resembled a dark green paste. The paste was then freeze dried and milled into a powder as in Example 1. The concentrations of thiol precursors in the powder from this method were: Cys-3SH—1.19 mg/kg and GSH-3SH—3.76 mg/kg.

Example 2: Products Prepared Using Grape Skin Compositions

Materials and Methodology

Brewing trials were carried out to assess the impact of the grape skin compositions when used as dry hop additions. The grape skin compositions of Example 1 were utilised as follows. A standard wort stream, comprised of malted barley and oats, was produced at a starting gravity of 1.050, or 12.5 degrees Plato, with bittering additions introduced at the start of the boil of Warrior hop extract. During the later boil and whirlpool, further additions of hops were made in restrained amounts. The resulting wort was cooled to 20° C., aerated and transferred into three 50 L temperature controlled, conical fermenters (FV1, FV2, FV3). Brewer's yeast (London Ale III™) was pitched, and the fermentation was started.

When the fermentation was at 6 degrees Plato, additions were made to the different fermenters comprising of:
- FV1—1 kg of '720 L/T grape skin powder' and 750 g of Nelson Sauvin hop pellets;
- FV2—1 kg of '750 L/T grape skin powder' and 750 g of Nelson Sauvin hop pellets; and
- FV3—750 g of Nelson Sauvin hop pellets.

The trials were allowed to continue fermenting in the presence of the grape skin powder and hop pellets for 48 hours, with fermentation capped at 21° C., and then these were dumped off the bottom of the tank. The beers were chilled, settled, and racked into kegs, and then packaged into 950 ml cans for storage.

Results

The aim of this trial was to assess the differences between fermented beverages prepared with the grape skin powders added versus a control fermentation beverage with just hops, all from a single stream of wort. Surprisingly, a strong hazing effect was observed for the resulting beer prepared with the grape skin powders. This was deemed to be advantageous as there is a preference for hazy appearance beverages. It is highly beneficial, then, that utilisation of the grape skin compositions can be used to create a stable haze in finished beer.

A sensory panel was assembled to include qualified brewers trained to identify and evaluate beer samples. The following results were obtained:

FV1 was found to have intense passionfruit aroma, with a white wine juicy flavour and soft mouth feel. FV2 was found to have strong tropical fruit aroma, overripe fruit flavour, and perceived 'dankness' with slightly higher bitterness levels. FV3 was found to have a subtle citrus aroma with underlying bitterness. The sensory panel found samples FV1 and FV2 to be ranked higher in preference and beer quality rating than FV3.

Persons of ordinary skill can utilise the disclosures and teachings herein to produce other embodiments and variations without undue experimentation. All such embodiments and variations are considered to be part of this disclosure.

Accordingly, one of ordinary skill in the art will readily appreciate from the disclosure that later modifications, substitutions, and/or variations performing substantially the same function or achieving substantially the same result as embodiments described herein may be utilised according to such related embodiments. Thus, this disclosure is intended to encompass, within its scope, the modifications, substitutions, and variations to processes, manufactures, compositions of matter, compounds, means, methods, and/or steps set out herein.

In this specification, where reference has been made to external sources of information, including patent specifications and other documents, this is generally for the purpose of providing a context for discussing the features of this disclosure. Unless stated otherwise, reference to such sources of information is not to be construed, in any jurisdiction, as an admission that such sources of information are prior art or form part of the common general knowledge in the art.

The description herein may contain subject matter that falls outside of the scope of the claimed invention. This subject matter is included to aid understanding of the invention.

REFERENCES

Anfang, N, Brajkovich, M, Goddard, M R. Co-fermentation with *Pichia kluyveri* increases varietal thiol concentrations in Sauvignon Blanc. Australian Journal of Grape Wine Research 15(1), 1-8, 2009.

Brajkovich, M, Peron, G, Lund, C M, Dykes, S I, Kilmartin, P A, Nicolau, L. Effect of screwcap and cork closures on $SO_2$ levels and aromas in a Sauvignon Blanc wine. Journal of Agricultural and Food Chemistry 53, 10006-10011, 2005.

Coetzee, C D T, du Toit, W J. A comprehensive review on Sauvignon blanc aroma with a focus on certain positive volatile thiols. Food Research International 45, 287-298, 2012.

Darriet, P, Tominaga, T, Lavigne, V, Boidron, J-N, Dubourdieu, D. Identification of a powerful aromatic component of *Vitis vinifera* L. var. Sauvignon wines: 4-mercapto-4-methylpentan-2-one. Flavour and Fragrance Journal 10(6), 385-392, 1995.

de Torres, C, Schumacher, R, Alañón, ME, Pérez-Coello, M S, Díaz-Maroto, M C. Freeze-dried grape skins by-products to enhance the quality of white wines from neutral grape varieties. Food Research International 69, 97-105, 2015.

Du Plessis, CS, Augustyn, O P H. Initial Study on the Guava Aroma of Chenin Blanc and Colombar Wines. South African Journal of Enology and Viticulture 2, 101, 1981.

Escalante, W D E. Perspectives and uses of non-saccharomyces yeasts in fermented beverages. Frontiers and New Trends in the Science of Fermented Food and Beverages, IntechOpen, DOI: http://dx.doi.org/10.5772/intechopen.81868

Holt, S, Miks, M H, de Carvalho, B T, Foulquie-Moreno, M R, Thevelein, J M. The molecular biology of fruity and floral aromas in beer and other alcoholic beverages. FEMS Microbiology Reviews 43, 193-222, 2019.

Jelley, R E, Herbst-Johnstone, M, Klaere, S, Pilkington, L I, Grose, C, Martin, D, Barker, D, Fedrizzi, B, Optimization of ecofriendly extraction of bioactive monomeric phenolics and useful flavor precursors from grape waste. ACS Sustainable Chemical Engineering 4, 5060-5067, 2016.

Jelley, R E, Deed, R C, Barker, D, Parish-Virtue, K, Fedrizzi, B. Fermentation of Sauvignon blanc grape marc extract yields important wine aroma 3-sulfanylhexan-1-ol (3SH). LWT—Food Science and Technology 131 109653, 2020.

Lund, C M T, Benkwitz, F, Wohler, M W, Triggs, C M, Gardner, R, Heymann, H, Nicolau, L. New Zealand Sauvignon Blanc Distinct Flavor Characteristics: Sensory, Chemical, and Consumer Aspects. American Journal of Enology and Viticulture 60, 1-12, 2009.

Maggu, M, Winz, R, Kilmartin, P A, Trought, M C T, Nicolau, L. effect of skin contact and pressure on the composition of sauvignon blanc must. Journal of Agricultural and Food Chemistry 55, 10281-10288, 2007.

Ribéreau-Gayon, P, Glories, Y, Maujean, A, Dubourdieu, D. Handbook of Enology: The chemistry of wine stabilization and treatments. John Wiley & Sons Ltd, Chicheste, 2006.

Robinson, J (ed) The Oxford Companion to Wine, Third Edition, Oxford University Press, 2006.

Roland, A, Schneider, R, Razungles, A, Cavelier, F. Varietal thiols in wine: discovery, analysis, and applications. Chemical Reviews 111, 7355-7376, 2011.

Spanos, G A and Wrolstad, R E. Influence of processing and storage on the phenolic composition of Thompson Seedless grape juice. Journal of Agricultural and Food Chemistry 38(7): 1565-1571, 1990.

Takoi, K, Degueil, M, Shinkaruk, S, Thibon, C, Maeda, K, Ito, K, Bennetau, B, Dubourdieu, D, Tominaga, T. Identification and characteristics of new volatile thiols derived from the Hop (*Humulus luplus* L.) cultivar Nelson Sauvin. Journal of Agricultural and Food Chemistry 57, 2493-2502, 2009.

Tominaga, T, Dubourdieu, D. A New Type of Flavor Precursors in *Vitis vinifera* L cv. Sauvignon Blanc-S-Cysteine Conjugates. Journal of Agricultural and Food Chemistry 46, 5215-5219, 1998.

Tominaga, T, Furrer, A, Henry, R, Dubourdieu, D. Identification of new volatile thiols in the aroma of *Vitis vinifera* L. var. Sauvignon Blanc wines Flavour and Fragrance Journal 13, 159-162, 1998.

Tominaga, T, Darriet, P, Dubourdieu, D. Identification de l'acétate de 3-mercaptohexanol, composé à forte odeur de buis, intervenant dans l'arôme des vins de Sauvignon Vitis 35, 207-210, 1996.

What is claimed is:

1. A method for preparing a grape skin powder and for preserving volatile thiol precursors in the grape skin powder, the method comprising:
   (i) obtaining skin and seeds of white wine grapes having flesh and juice components of the white wine grapes substantially removed,
   (ii) directly freezing the skin and seeds of the white wine grapes,
   (iii) thawing the skin and seeds of the white wine grapes from step (ii) to a pliable state, wherein the thawing is carried out over at least 24 hours, and
   (iv) drying the thawed skin and seeds of the white wine grapes from step (iii) to produce the grape skin powder, wherein the grape skin powder contains at least one volatile thiol precursor at levels of at least 5,000 ng/kg.

2. The method of claim 1, wherein the grape skin powder contains at least one volatile thiol precursor at levels of at least 10,000 ng/kg.

3. The method of claim 1, wherein the white wine grapes comprise one or more of:
   (a) aromatic white wine grapes;
   (b) aromatic white wine grapes from New Zealand, Australia, South Africa, South America, or any combination thereof;
   (c) Sauvignon Blanc, Albariño, Chenin Blanc, Colombard, Friulano, Tocai, Grüner Veltliner, Traminer, Verdicchio, Verdejo, Vermentino, Scheurebe, Maccabeo, Gewürztraminer, Riesling, Muscat, Petit Manseng, Pinot Gris, and Tokay grapes, or any combination thereof; or
   (d) Sauvignon Blanc grapes from the Marlborough region of New Zealand.

4. The method of claim 1, which includes one or more of:
   (a) substantial removal of the flesh and juice components of (i) comprises crushing or pressing the white wine grapes;
   (b) the freezing of (ii) comprises blast freezing;
   (c) the freezing of (ii) comprises cryomaceration;
   (d) the drying of (iv) comprises freeze drying;
   (e) adding at least one antioxidant or preservative before or after (i);
   (f) milling the grape skin powder of (iv) to obtain a milled product; or
   (g) formulating the grape skin powder of (iv) to obtain a pellet.

5. The method of claim 4, which includes one or more of:
   (a) the pressing is performed by a pneumatic press or a basket press;
   (b) the pressing is performed with a press setting ranging from about 600 to about 800 litres per tonne;
   (c) the pressing is performed with a press setting ranging from about 650 to about 720 litres per tonne;
   (d) the milled product comprises a flake or a powder; or
   (e) the pellet is formulated to include one or more hops.

6. The method of claim 5, wherein:
   (a) the one or more hops are selected from the group consisting of: American, Australian, English, German, New Zealand, and South African hops, and any combination thereof;
   (b) the one or more hops are selected from the group consisting of: Nelson Sauvin hops, Hallertau Blanc hops, Tomahawk hops, Simcoe hops, Summit hops, Cascade hops, and any combination thereof; or
   (c) the one or more hops are selected from the group consisting of: Citra, Chinook, Loral, Mosaic, Amarillo, Centennial, Ekuanot, Sabro, Southern Cross, Pacific Gem, Pacific Jade, Riwaka, Dr Rudi, Wakatu, Wai iti, Waimea, Kohatu, Motueka, Green Bullet, Hort 4337, Hort 9909, Orbit, Rakau, Pacifica, Styrian Golding, Strata, Galaxy, Ella, Enigma, and Vic Secret hops, and any combination thereof.

7. A method of making a fermented beverage, comprising:
preparing a mixture comprising yeast, liquid, and composition comprising a grape skin powder, wherein the grape skin powder is prepared
by a method that preserves volatile thiol precursors in the grape skin powder, the method comprising:
   (i) obtaining skin and seeds of white wine grapes having flesh and juice components of the white wine grapes substantially removed,
   (ii) directly freezing the skin and seeds of the white wine grapes,
   (iii) thawing the skin and seeds of the white wine grapes from step (ii) to a pliable state, wherein the thawing is carried out over at least 24 hours, and
   (iv) drying the thawed skin and seeds of the white wine grapes from step (iii) to produce the grape skin powder, wherein the grape skin powder contains at least one volatile thiol precursor at levels of at least 5.000 ng/kg, and
fermenting the mixture to obtain the fermented beverage.

8. The method of claim 7, wherein the fermented beverage includes at least 50 ng/L to at least 12,000 ng/L 3-mercaptohexyl acetate (3MHA); and/or at least 150 ng/L to at least 20,000 ng/L 3-mercaptohexan-1-ol (3MH).

9. The method of claim 7, wherein the white wine grapes comprise one or more of:
   (a) aromatic white wine grapes;
   (b) aromatic white wine grapes from New Zealand, Australia, South Africa, South America, or any combination thereof;
   (c) Sauvignon Blanc, Albariño, Chenin Blanc, Colombard, Friulano, Tocai, Grüner Veltliner, Traminer, Verdicchio, Verdejo, Vermentino, Scheurebe, Maccabeo, Gewürztraminer, Riesling, Muscat, Petit Manseng, Pinot Gris, and Tokay grapes, or any combination thereof; or
   (d) Sauvignon Blanc grapes from the Marlborough region of New Zealand.

10. The method of claim 7, which includes one or more of:
   (a) substantial removal of the flesh and juice components of (i) comprises crushing or pressing the white wine grape;
   (b) the freezing of (ii) comprises blast freezing;

(c) the freezing of (ii) comprises blast chilling or cryomaceration;
(d) the drying of (iv) comprises freeze drying;
(b) adding at least one antioxidant or preservative before or after (i);
(f) milling the dried product of (iv) to obtain a milled product; or
(g) formulating the dried product of (iv) to obtain a pellet.

11. The method of claim 10, which includes one or more of:
(a) the pressing is performed by a pneumatic press or a basket press;
(b) the pressing is performed with a press setting ranging from about 600 to about 800 litres per tonne;
(c) the pressing is performed with a press setting ranging from about 650 to about 720 litres per tonne;
(d) the milled product comprises a flake or a powder; or
(e) the pellet is formulated to include one or more hops.

12. The method of claim 7, which includes one or more of:
(a) the yeast is selected from the group consisting of: *Saccharomyces, Brettanomyces, Kloeckera, Candida,* and *Hanseniaspora* yeasts;
(b) the yeast is a *Saccharomyces cerevisiae* yeast;
(c) the yeast is a yeast that produces volatile thiols from corresponding precursor compounds;
(d) the composition is prepared as a flake or a powder;
(e) the composition is formulated as a pellet;
(f) the composition is formulated to include one or more hops; or
(g) one or more hops are included during fermentation.

13. The method of claim 7, wherein:
(a) the one or more hops are selected from the group consisting of: American, Australian, English, German, New Zealand, and South African hops, and any combination thereof;
(b) the one or more hops are selected from the group consisting of: Nelson Sauvin hops, Hallertau Blanc hops, Tomahawk hops, Simcoe hops, Summit hops, Cascade hops, and any combination thereof; or
(c) the one or more hops are selected from the group consisting of: Citra, Chinook, Loral, Mosaic, Amarillo, Centennial, Ekuanot, Sabro, Southern Cross, Pacific Gem, Pacific Jade, Riwaka, Dr Rudi, Wakatu, Wai iti, Waimea, Kohatu, Motueka, Green Bullet, Hort 4337, Hort 9909, Orbit, Rakau, Pacifica, Styrian Golding, Strata, Galaxy, Ella, Enigma, and Vic Secret hops, and any combination thereof.

14. The method of claim 7, wherein the fermented beverage is one or more of:
(a) an alcoholic, non-alcoholic, or reduced-alcohol beverage;
(b) a beer, beer-wine hybrid, fruit beer, cider, or kombucha;
(c) a beer being selected from the group consisting of: barley or other cereal beers, maize beers, millet beers, oat beers, rice beers, rye beers, sorghum beers, and wheat beers;
(d) a beer being selected from the group consisting of: ales, lagers, pilsners, porters, saisons, and stouts; or
(e) an India Pale Ale beer.

* * * * *